United States Patent
Kazmi et al.

(10) Patent No.: US 11,006,286 B2
(45) Date of Patent: May 11, 2021

(54) OPERATION IN AN ENVIRONMENT WITH TWO DIFFERENT RADIO ACCESS TECHNOLOGIES

(71) Applicant: Telefonaktiebolaget LM Ericsson (publ), Stockholm (SE)

(72) Inventors: Muhammad Kazmi, Sundbyberg (SE); Ali Behravan, Stockholm (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 15/325,906

(22) PCT Filed: Dec. 23, 2016

(86) PCT No.: PCT/EP2016/082617
§ 371 (c)(1),
(2) Date: Jan. 12, 2017

(87) PCT Pub. No.: WO2017/121613
PCT Pub. Date: Jul. 20, 2017

(65) Prior Publication Data
US 2018/0213599 A1     Jul. 26, 2018

Related U.S. Application Data

(60) Provisional application No. 62/277,535, filed on Jan. 12, 2016.

(51) Int. Cl.
*H04B 1/10*     (2006.01)
*H04B 1/68*     (2006.01)
(Continued)

(52) U.S. Cl.
CPC ............ *H04W 24/02* (2013.01); *H04B 1/10* (2013.01); *H04B 1/68* (2013.01); *H04B 1/715* (2013.01);
(Continued)

(58) Field of Classification Search
CPC ...... H04B 1/10–14; H04B 1/68; H04B 1/715; H04B 2001/7152–7154;
(Continued)

(56) References Cited

U.S. PATENT DOCUMENTS

2013/0308481 A1* 11/2013 Kazmi ................. H04W 24/02
2017/0171799 A1*  6/2017 Dash .................... H04W 24/02

FOREIGN PATENT DOCUMENTS

WO    WO-2015081992 A1 *  6/2015  ........ H04W 72/1215

OTHER PUBLICATIONS

3rd Generation Partnership Project. Technical Specification Group Radio Access Network; Evolved Universal Terrestrial Radio Access (E-UTRA); Base Station (BS) radio transmission and reception (Release 13); Sep. 2015; pp. 1-156; 3GPP TS 36.104 v13.1.0; Sophia Antipolis, Valbonne, France.
(Continued)

*Primary Examiner* — Timothy J Weidner
(74) *Attorney, Agent, or Firm* — Coats & Bennett, PLLC

(57) ABSTRACT

The invention relates to a method for operating a first access node (100) of a first cellular network in which a first user entity (200) uses a first access technology with at least one first carrier frequency to access a first cell (110) of the first cellular network, the at least one first carrier frequency having a bandwidth. It comprises:
  determining that a second user entity (400) or a second access node (300) using a second access technology different from the first access technology may operate in the first cell (110) within the bandwidth of the at least one first carrier frequency in order to access a second cellular network,
  transmitting information to the first user entity (200) by which the first user entity is informed about the fact that the second user entity (400) or second access node may
(Continued)

operate in the first cell within the bandwidth of the at least one first carrier frequency using the second access technology.

11 Claims, 7 Drawing Sheets

(51) Int. Cl.
| | |
|---|---|
| *H04B 1/715* | (2011.01) |
| *H04B 17/24* | (2015.01) |
| *H04B 17/26* | (2015.01) |
| *H04J 11/00* | (2006.01) |
| *H04L 1/00* | (2006.01) |
| *H04L 5/00* | (2006.01) |
| *H04W 8/24* | (2009.01) |
| *H04W 16/14* | (2009.01) |
| *H04W 24/02* | (2009.01) |
| *H04W 24/10* | (2009.01) |
| *H04W 48/10* | (2009.01) |
| *H04W 48/12* | (2009.01) |
| *H04W 72/12* | (2009.01) |
| *H04W 88/06* | (2009.01) |
| *H04W 88/10* | (2009.01) |

(52) U.S. Cl.
CPC ............ *H04B 17/24* (2015.01); *H04B 17/26* (2015.01); *H04J 11/0023* (2013.01); *H04J 11/0093* (2013.01); *H04L 1/0001* (2013.01); *H04L 5/0053* (2013.01); *H04L 5/0096* (2013.01); *H04W 8/245* (2013.01); *H04W 16/14* (2013.01); *H04W 24/10* (2013.01); *H04W 48/10* (2013.01); *H04W 48/12* (2013.01); *H04W 72/1215* (2013.01); *H04B 2001/7152* (2013.01); *H04W 88/06* (2013.01); *H04W 88/10* (2013.01)

(58) Field of Classification Search
CPC . H04B 7/24–2696; H04B 17/0082–382; H04J 11/0023–0093; H04J 2011/0096; H04L 1/0001–0039; H04L 1/0078–0091; H04L 5/0001–26; H04W 4/70; H04W 8/22–245; H04W 16/02–16; H04W 24/02; H04W 24/10; H04W 28/02–085; H04W 48/02–20; H04W 88/06; H04W 88/10
See application file for complete search history.

(56) References Cited

OTHER PUBLICATIONS

Ericsson; "NB-loT-DL Design"; 3GPP TSG-RAN WG1 #83; Nov. 15-22, 2015; pp. 1-11; R1-157419; XP051042206; 3rd Generation Partnership Project; Anaheim, CA.
3rd Generation Partnership Project; "Technical Specification Group GSM/EDGE Radio Access Network; Cellular system support for ultra-low complexity and low throughput Internet of Things (CIoT) (Release 13)"; Nov. 2015; pp. 1-495; 3GPP TR 45.820 V13.1.0; Sophia Antipolis, France.

* cited by examiner

OPERATION IN AN ENVIRONMENT WITH TWO DIFFERENT RADIO ACCESS TECHNOLOGIES

TECHNICAL FIELD

The present invention relates to a method for operating a first access node in a first cellular network, to a method for operating a first user entity using a first access technology in the first cellular network. The invention furthermore relates to a method for operating a second access node of the second cellular network and to a method for operating a second user entity communicating with the second access node.

BACKGROUND

Narrow Band Internet of Things (NB-IoT):

In GERAN #62, a study item on "Cellular System Support for Ultra Low Complexity and Low Throughput Internet of Things" was approved. The aim was to study both the possibility of evolving current GERAN system and the design of a new access system towards low complexity and low throughput radio access technology to address the requirements of cellular internet of things. The objectives of the study were: improved indoor coverage, support for massive number of low throughput devices, low delay sensitivity, ultra-low device cost, low device power consumption and (optimized) network architecture. As per the PCG #34 decisions, it was agreed to move the normative phase of a single "clean-slate solution" to 3GPP LTE. This feature is called NarrowBand Internet of Things (NB-IOT).

3GPP LTE represents the project within the third generation partnership project, with an aim to improve the UMTS standard. 3GPP LTE radio interface offers high peak data rates, low delays and increase in spectral efficiencies. LTE ecosystem supports both Frequency division duplex (FDD) and Time division duplex (TDD). This enables the operators to exploit both the paired and unpaired spectrum since LTE has flexibility in bandwidth as it supports 6 bandwidths 1.4 MHz, 3 MHz, 5 MHz, 10 MHz, 15 MHz and 20 MHz.

The objective of this new work item on NB-IOT is to specify a radio access for cellular internet of things, based to a great extent on a non-backward-compatible variant of E-UTRA, that addresses improved indoor coverage, support for massive number of low throughput devices, low delay sensitivity, ultra low device cost, low device power consumption and (optimized) network architecture.

NB-IoT should support 3 different modes of operation:
1. 'Stand-alone operation' utilizing for example the spectrum currently being used by GERAN systems as a replacement of one or more GSM carriers. In principle it operates on any carrier frequency which is neither within the carrier of another system nor within the guard band of another system's operating carrier. The other system can be another NB-IOT operation or any other RAT e.g. LTE.
2. 'Guard band operation' utilizing the unused resource blocks within a LTE carrier's guard-band. The term guard band may also interchangeably called as guard bandwidth.
3. 'In-band operation' utilizing resource blocks within a normal LTE carrier. The in-band operation may also interchangeably called as in-bandwidth operation.

In NB-IOT the downlink transmission is based on OFDM with 15 kHz subcarrier spacing for all the scenarios: stand-alone, guard-band, and in-band. For UL transmission, both multi-tone transmissions based on SC-FDMA, and single tone transmission is supported. This means that the physical waveforms for NB-IoT in downlink and also partly in uplink is similar to legacy LTE.

In the downlink design, NB-IOT supports both master information broadcast and system information broadcast which are carried by different physical channels. For in-band operation, it is possible for NB-IOT UE to decode NB-PBCH without knowing the legacy PRB index. NB-IOT supports both downlink physical control channel (NB-PDCCH) and downlink physical shared channel (PDSCH). The operation mode of NB-IOT must be indicated to the UE and currently 3GPP consider indication by means of NB-SSS, NB-MIB or perhaps other downlink signals.

At the moment, reference signals used in NB-IOT has not been decided by 3GPP, however it is expected that the general design principle will follow that of legacy LTE. Downlink synchronization signal will most likely consists of primary synchronization signal (NB-PSS) and secondary synchronization signal (NB-SSS).

In the following we briefly describe reference signals in LTE that might be the basis for the NB-IOT reference signal designs.

Downlink Reference Signals in LTE:

Downlink reference signals are predefined signals occupying specific resource elements within the downlink time-frequency grid. The LTE specification includes several types of downlink reference signals that are transmitted in different ways and used for different purposes by the receiving terminal:

Cell-specific reference signals (CRS): These reference signals are transmitted in every downlink subframe and in every resource block in the frequency domain, thus covering the entire cell bandwidth. The cell-specific reference signals can be used by the terminal for channel estimation for coherent demodulation of any downlink physical channel except for PMCH and for PDSCH in the case of transmission modes 7, 8, or 9 [see 3GPP TS 36.104]. The cell-specific reference signals can also be used by the terminal to acquire channel-state information (CSI). Finally, terminal measurements on cell-specific reference signals are used as the basis for cell-selection and handover decisions.

Demodulation reference signals (DM-RS): These reference signals also sometimes referred to as UE-specific reference signals, are specifically intended to be used by terminals for channel estimation for PDSCH in the case of transmission modes 7, 8, 9 or 10. The label "UE-specific" relates to the fact that each demodulation reference signal is intended for channel estimation by a single terminal. That specific reference signal is then only transmitted within the resource blocks assigned for PDSCH transmission to that terminal.

CSI reference signals (CSI-RS): These reference signals are specifically intended to be used by terminals to acquire channel-state information (CSI) in the case when demodulation reference signals are used for channel estimation. CSI-RS have a significantly lower time/frequency density, thus implying less overhead, compared to the cell-specific reference signals.

Positioning reference signals (PRS): Positioning reference signals are used to improve positioning performance, and are transmitted by the base station in a number of consecutive downlink subframes, where this number is configured at the UE by higher layers.

Multicast/Broadcast single frequency network (MBSFN) reference signals: MBSFN reference signals are used for channel estimation by a UE in an MBSFN subframe, where all cells in the MBSFN area transmits the same reference symbols.

Discovery reference signals (DRS): The DRS may comprise of any combination of CRS, CSI-RS, PSS and SS. The DRS are typically transmitted in specific subframes with some periodicity e.g. 40 ms, 80 ms and 160 ms.

Sidelink reference signals: The sidelink in a cell contains radio resources which are used for D2D operation aka proximity services (ProSe) operation where UEs directly communicate with each other over wireless link i.e. sidelink (SL). Specific examples of ProSe operation are ProSe direct communication, ProSe direct discovery etc. Examples of SL reference signals are primary sidelink synchronization signal (PSSS), secondary sidelink synchronization signal (SSSS), sidelink demodulation reference signals (S-DMRS) etc.

Two of the above reference signals that are more relevant to this invention are explained in more details in the following.

Positioning Reference Signal:

In LTE Release 9, special positioning subframes are devised to improve OTDOA positioning performance. These positioning subframes typically do not contain any data and only carry positioning reference signals together with CRS. However data transmission may also take place in these subframes. Positioning reference signals are transmitted by the base station in a number of consecutive downlink subframes, where this number is configured at the UE by higher layers. The PRS transmission takes place over antenna port #6 (aka $R_6$) and is shown in FIG. 1. FIG. 1 shows an embodiment with a PRS transmission in a subframe when one or two antennas are used for PBCH under normal CP.

A set of consecutive DL subframes containing PRS is also called as positioning occasion or simply PRS occasion. The DL subframe containing PRS is also interchangeably called as PRS subframe. Within a positioning occasion any number of PRS subframes ranging from 1 to 6 can be configured. There are 4 different PRS periodicities or more specifically PRS occasion periodicity. They are 160 ms, 320 ms, 640 ms, and 1280 ms.

The PRS periodicity is also interchangeably called as positioning configuration period, PRS period or PRS configuration period. In frequency domain the PRS are transmitted over the BW equal to or less than the BW of the cell. The PRS BW (aka PRS transmission BW) can be any of: 6, 15, 25, 50, 75 and 100 RBs. In order to reduce interference at the UE for receiving PRS from another cell (e.g. cell2), the PRS in one or more PRS occasions in a cell (e.g. cell1) can be muted (i.e. not transmitted or transmitted with low or reduced power). For example all PRS subframes in every $4^{th}$ PRS occasion can be muted or 2 out of 8 PRS occasions can be muted; the corresponding muting pattern is signaled to the UE by the positioning node.

These parameters (aka PRS configuration parameters) are illustrated in FIG. 2 where an example of PRS occasion containing 2 PRS subframes occurring with certain periodicity is shown.

MBSFN Reference Signals:

MBSFN subframes are defined from Rel-8 in LTE with the intention to support multicast/broadcast transmission. Each MBSFN subframe contains a control region at the beginning of the subframe and a data region. An MBSFN area can comprise one or more cells which transmit the same MBSFN signals. Since the UE needs an estimation of the combined radio channel for coherent detection of the multicast channel (MCH), normal cell specific reference signals cannot be used. For that purpose, special MBSFN reference signals are transmitted over the set of cells in one MBSFN area. The reference symbols that are transmitted from all eNBs in the MBSFN area, are the same sequences and they use the same time and frequency resources. Therefore the channel estimation reflects the overall aggregated channel between all eNBs in the same MBSFN area and the UE.

Measurements:

RRM Measurement:

Several radio related measurements are used by the UE or the radio network node to establish and keep the connection, as well as ensuring the quality of a radio link.

The UE has to first detect a cell and therefore cell identification e.g. acquisition of a physical cell identity (PCI), is also a signal measurement. The UE may also have to acquire the cell global ID (CGI) of a cell.

The UE reads the SI of the target cell (e.g. intra-, inter-frequency or inter-RAT cell) upon receiving an explicit request from the serving network node via RRC signaling e.g. from RNC in HSPA or eNode B in case of LTE. The acquired SI is then reported to the serving cell. The signaling messages are defined in the relevant HSPA and LTE specifications.

In order to acquire the SI which contains the CGI of the target cell, the UE has to read at least part of the system information (SI) including master information block (MIB) and the relevant system information block (SIB) as described later. The terms SI reading/decoding/acquisition, CGI/ECGI reading/decoding/acquisition, CSG SI reading/decoding/acquisition are interchangeably used but have the same or similar meaning.

The RSRP and RSRQ are the two existing measurements used for at least RRM such as for mobility, which include mobility in RRC connected state as well as in RRC idle state. The RSRP and RSRQ are also used for other purposes such as for enhanced cell ID positioning, minimization of drive test etc. Other examples of UE measurements are UE Rx-Tx time difference measurement, reference signal time difference (RSTD) etc.

Examples of MBSFN related measurements are MBSFN MCH BLER, MBSFN RSRP, MBSFN RSRQ etc.

Examples of ProSe related measurements are SL RSRP (S-RSRP), SL-RSRQ (S-RSRQ) etc.

In RRC connected state the UE can perform intra-frequency measurements without measurement gaps. However as a general rule the UE performs inter-frequency and inter-RAT measurements in measurement gaps unless it is capable of performing them without gaps. Two periodic measurement gap patterns both with a measurement gap length of 6 ms are defined for LTE:

Measurement gap pattern #0 with repetition period 40 ms

Measurement gap pattern #1 with repetition period 80 ms

The measurements performed by the UE are then reported to the network, which may use them for various tasks.

The radio network node (e.g. base station or access node) may also perform signal measurements. Examples of radio network node measurements in LTE are propagation delay between UE and itself, UL SINR, UL SNR, UL signal strength, Received Interference Power (RIP), timing advance (TA), eNode Rx-Tx time difference measurement etc. The eNB may also perform positioning measurements which are described in a later section.

The UE also performs measurements on the serving cell (aka primary cell) in order to monitor the serving cell performance. This is called as radio link monitoring (RLM) or RLM related measurements in LTE.

For RLM the UE monitors the downlink link quality based on the cell-specific reference signal in order to detect the downlink radio link quality of the serving or PCell.

In order to detect out of sync and in sync the UE compares the estimated quality with the thresholds Qout and Qin respectively. The threshold Qout and Qin are defined as the level at which the downlink radio link cannot be reliably received and corresponds to 10% and 2% block error rate of a hypothetical PDCCH transmissions respectively.

When an NB-IoT is deployed as part of existing LTE system and inside the LTE channel bandwidth (in-band or guard-band), some of the LTE resources are used by the new RAT i.e. NB-IoT. The resources used by the new RAT may collide with some legacy reference symbols, etc., in which case can cause problem in the legacy RAT to perform its normal operation. As an example the resource block (RBI) used for in-band NB-IOT operation within the legacy RAT carrier bandwidth (e.g. LTE carrier bandwidth) is expected to carry PRS but will not contain PRS in reality. A legacy UE (i.e. LTE UE) using such radio resource for PRS based measurements (e.g. RSTD) will not be able to perform its normal positioning operation based on PRS. As a result even the positioning may fail. The problem is not restricted to LTE as the same problem can occur when different user entities using different access technologies act in the same frequency band or at least in the same bandwidth.

SUMMARY

Accordingly a need exists to improve the operation of the entities involved in a situation as discussed above in which two different user entities with two different access technologies operate in the same bandwidth of a frequency band.

This need is met by the features of the independent claims. Further aspects are described in the dependent claims.

According to a first aspect a method for operating a first access node of a first cellular network is provided in which a first user entity uses a first access technology with at least one first carrier frequency to access a first cell of the first cellular network, the at least one first carrier frequency having a bandwidth. The method comprises the step of determining that a second user entity or second access node using a second access technology different from the first access technology may operate in the first cell within the bandwidth of the at least one first carrier frequency in order to access a second cellular network. Furthermore information, e.g. advise information, is transmitted to the first user entity by which the first user entity is informed about the fact that the second user entity or second access node may operate in the first cell within the bandwidth of the at least one first carrier frequency using the second access technology.

The information such as advise information can comprise the information that the second user entity or second access node already operates or will operate in the first cell with second access technology.

According to another aspect a method for operating a first user entity is provided which uses a first access technology with at least one first carrier frequency to access a first access node in a first cell of a first cellular network, the at least one first carrier frequency having a first bandwidth. The method comprises the steps of receiving information, e.g. advise information, from the first access node by which the first user entity is informed that a second user entity or second access node using a second access technology different from the first access technology may operate in the first cell within the bandwidth of the at least one first carrier frequency in order to access a second cellular network. An operation of the first user entity is adapted in order to maintain the operation in the first cellular network in accordance with the first access technology while the second user entity or second access node operates within the bandwidth of the at least one first carrier frequency using the second access technology.

According to another aspect a method for operating a second access node of a second cellular network is provided in which a second user entity uses a second access technology with at least one second carrier frequency to access a second cell of the second cellular network. The method comprises the steps of determining that the second access node or second user entity may operate in the second cell within a bandwidth of a first carrier frequency used to access the first cellular network with a first access technology. Furthermore, information, e.g. operation information, is transmitted to the second user entity by which the second user entity is informed that the second access node or second user entity is operating with the second access technology within the bandwidth of the at least one first carrier frequency.

Additionally a method for operating a second user entity is provided. The method for operating a second user entity which uses a second access technology with at least one second carrier frequency to access a second access node in a second cell of the second cellular network, comprises the steps of:

receiving information, e.g. operation information, from the second access node by which the second user entity is informed that the second access node or the second user entity is operating in the second cell on radio resources within a bandwidth of a first carrier frequency used to access a first cellular network with a first access technology, adapting the operation of the second user entity taking into account the received operation information.

The invention furthermore relates to the corresponding first access node, second access node, first user entity, and second user entity and to a computer program comprising program code.

It is to be understood that the features mentioned above and features yet to be explained below can be used not only in the respective combinations indicated, but also in other combinations or in isolation without departing from the scope of the present invention. Features of the above-mentioned aspects and embodiments may be combined with each other in other embodiments unless explicitly mentioned otherwise.

BRIEF DESCRIPTION OF THE DRAWINGS

The foregoing and additional features and effects of the application will become apparent from the following detailed description when read in conjunction with the accompanying drawings in which like reference numerals refer to like elements.

DETAILED DESCRIPTION OF EMBODIMENTS

Figure 1:
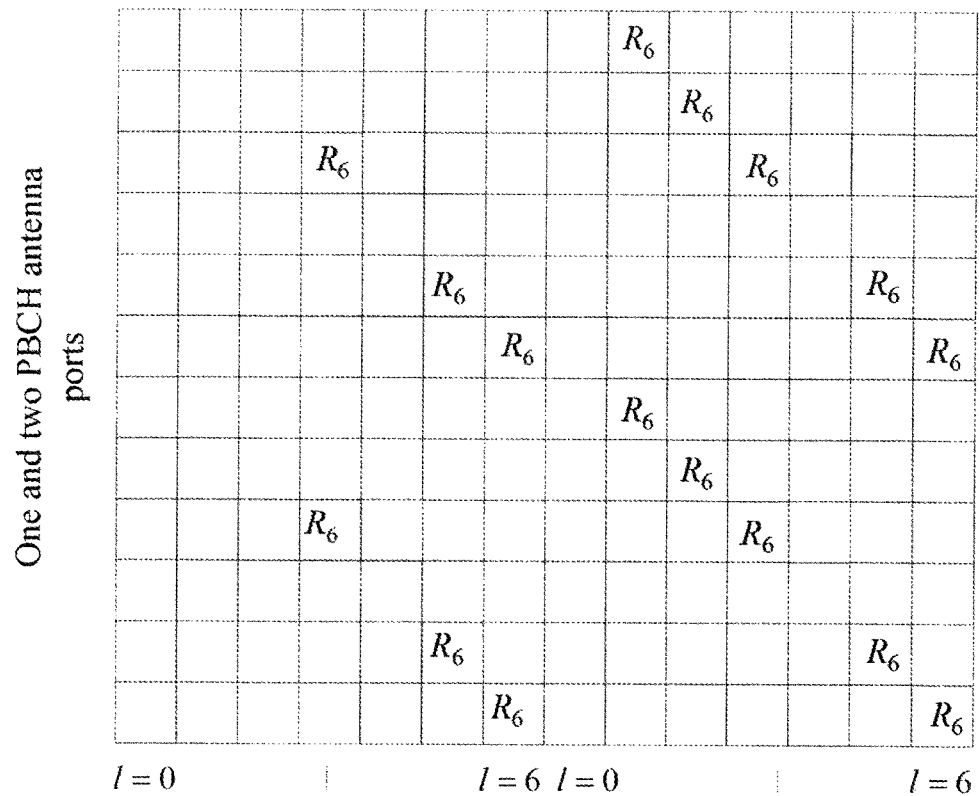
FIG. 1 shows an example of PRS transmission in a subframe using a first radio access technology when one or two antennas are used.
Figure 2:
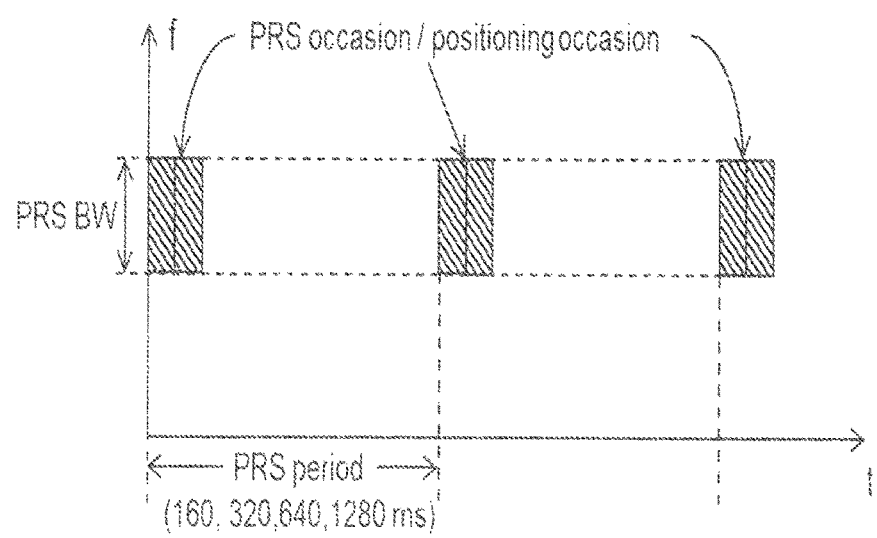
FIG. 2 shows an example of PRS occasion containing two PRS subframes occurring certain periodicity.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are to be illustrative only.

The drawings are to be regarded as being schematic representations, and elements illustrated in the drawings are not necessarily shown to scale. Rather, the various elements are represented such that their function and general purpose becomes apparent to a person skilled in the art. Any connection or coupling between functional blocks, devices, components of physical or functional units shown in the drawings and described hereinafter may also be implemented by an indirect connection or coupling. A coupling between components may be established over a wired or wireless connection. Functional blocks may be implemented in hardware, software, firmware, or a combination thereof.

Figure 3:
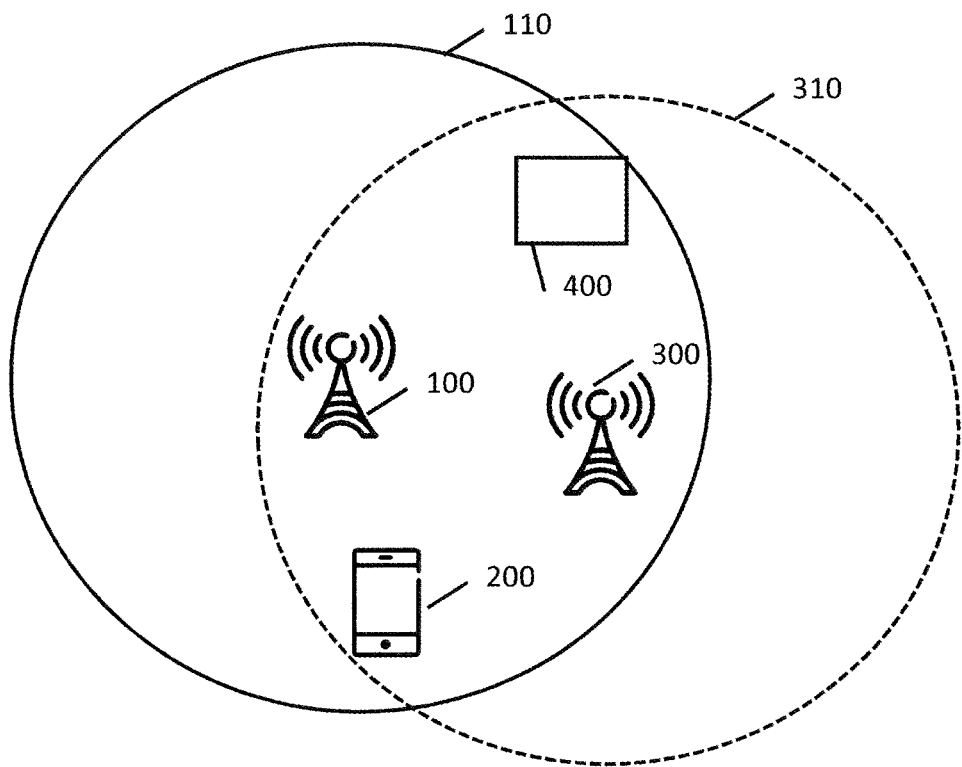
FIG. 3 shows an example situation according to the invention where two user entities using two different access technologies operate within the same cell of one of the cellular networks.

FIG. 3 shows an example situation where a first radio access node 100 is communicating with first user entity 200, such as a mobile entity. The first radio access node 100 and the first mobile entity 200 are part of first cellular network wherein a first cell 110 of the cellular network is shown. The first radio access node 100 and the first user entity 200 interact with a first access technology which has at least one first carrier frequency, wherein each first carrier frequency has a corresponding bandwidth. The first access technology may be LTE, but any other access technology may be used. Within the first cell 110 a second access node 300 is provided which is part of a second cellular network in which a second user entity 400 communicates with the second access node 300 using a second access technology. The second access technology is different to the first access technology. They can contain common features, but not all the features of access technology one may be implemented in access technology two. A cell 310 of the second cellular network is shown in dashed lines. In the following the first access node may be also called first network node, the second access node 300 may be called second network node. The first user entity 200 may be a mobile phone, portable computer device, stationary computer device, or any other kind of wirelessly connected device. The second user entity may be an entity working in accordance with in NB-IoT or may also be a mobile phone, portable computer device, stationary computer device, or any other kind of wirelessly connected device.

In the following some general aspects of the invention are described.

A method in a first network node (NW1, e.g. node 100 of FIG. 3) serving a first UE (UE1 or UE 200 of FIG. 3) with a first RAT (RAT1) in a first cell (e.g. cell 110) comprising the steps of:
1. determining that a second RAT (RAT2) operates or is expected to operate (i.e. may operate) on radio resources (e.g. RB) within a bandwidth (BW1) of a carrier frequency (f1) of RAT1 in at least cell1;
2. signaling information about the determined operation of RAT2 within BW1 of RAT1 to UE1;
3. adapting (optionally) one or more procedures to enable the operation of RAT2 within BW1 of RAT1 e.g.
   a. adaptation or adjustment of the transmission of legacy LTE signals in eNB to avoid their collision or overlapping with one or more RAT2 signals in time and/or frequency within BW1;
   b. adaptation of one or more requirements related to reception and/or transmission of signals at the first network node based on the RAT2 operation within BW1 e.g. such as extending measurement period of a radio measurement performed by NW2.

A method in a second network node (NW2 or node 300 of FIG. 3) serving a second UE (UE2 or UE 400 of FIG. 3) with a second RAT (RAT2) in a second cell (cell2 cell 310 of FIG. 3) comprising the steps of:
1. determining that a second RAT (RAT2) operates or is expected to operate in at least cell2 on radio resources (e.g. RB) within a bandwidth (BW1) of a carrier frequency (f1) of RAT1;
2. signaling information about the determined operation of RAT2 within BW1 of RAT1 to UE2;
3. adapting (optionally) one or more procedures to enable the operation of RAT2 within BW1 of RAT1 e.g. adaptation or adjustment of the transmission and/or reception of one or more radio signals related to RAT2 within BW1.

A method in a first UE (UE1 or UE 200 of FIG. 3) served by a first network node (NW1, node 100 of FIG. 3) with a first RAT (RAT1) in a first cell (cell1) comprising the steps of:

1. receiving from NW1, an information indicating that a second RAT (RAT2) operates or is expected to operate on radio resources (e.g. RB) within a bandwidth (BW1) of a carrier frequency (f1) of RAT1 in at least cell1;
2. using the received information for adapting one or more tasks or procedures or operations to enable the operation RAT1 while RAT2 operates within BW1 e.g. adaptation or adjustment of one or more measurement procedures to account for missed RAT1 related reference signals in radio resources used for RAT2 within BW1;
3. signaling (optionally) its capability of adapting its operation to NW1.

A method in a second UE (UE2 or UE 400 of FIG. 3) served by a second network node (NW2 or node 300 if FIG. 3) with a second RAT (RAT2) in a second cell (cell2 cell 310 of FIG. 3) comprising the steps of:

1. receiving from NW2, an information indicating that a second RAT (RAT2) operates or is expected to operate in at least cell2 on radio resources (e.g. RB) within a bandwidth (BW1) of a carrier frequency (f1) of RAT1;
2. using the received information for adaptation of one or more tasks or operations or procedures e.g. using more robust transport format to reduce or avoid interference towards RAT1;
3. signaling (optionally) its capability of adapting its operation to NW2.

The first access technology can comprise at least one first carrier frequency, preferably a plurality of carrier frequencies. Each carrier frequency has a corresponding bandwidth. The second access technology operates within the bandwidth of the first access technology, either as guard band operation or in-band operation.

Note that terminology such as base station, NodeB or eNode B and UE should be considering non-limiting and does in particular not imply a certain hierarchical relation between the two; in general "NodeB" could be considered as device 1 and "UE" device 2, and these two devices communicate with each other over some radio channel. A generic term network node is used in some embodiments. The network node can be a base station, access point, NodeB or eNode B etc. A generic term wireless device is used in some embodiments. The wireless device can be any type of UE such as D2D UE, MTC UE, M2M UE etc. The MTC or M2M UE may also be interchangeably called as, narrow band or narrow BW UE, category 0 UE, category M UE, low cost and/or low complexity UE etc. Yet another generic term, radio node, may be used in some embodiments. The radio node may be a network node or a wireless device.

In some embodiment several radio nodes or radio network nodes may be used e.g. first radio node or a first network node, second radio node or second network node, etc. In some embodiments the first network node transmits signals to and/or receives signals from one or more UEs using a first RAT in at least one cell (e.g. cell1) on a carrier frequency, f1. The cell1 may typically be the serving cell of these UEs. There may be plurality of cells operating on f1 e.g. serving cell and one or more neighbor cells. The cells on f1 may operating by using the same or different RATs or different combination of RATs. Examples of the first RAT are LTE, HSPA etc. In some embodiments the second network node transmits and/or receives signals to one or more UEs using a second RAT on cell2. Examples of the second RAT are NB-IOT, RAT based on narrow bandwidth of LTE, RAT based on narrow bandwidth (e.g. 200 KHz, 180 KHz etc.) comprising of OFDMA with 15 KHz of subcarrier spacing in DL and SC-FDMA in UL, RAT based on narrow bandwidth comprising of OFDMA with 3.75 KHz of subcarrier spacing in DL and GMSK in UL etc. Therefore the first RAT and the second RAT operated by the first and the second network nodes respectively are different.

The UE may operate under either normal coverage or enhanced coverage with respect to its serving cell. The enhanced coverage is also interchangeably called as extended coverage. The UE may also operate in a plurality of coverage levels (i.e. move within different coverage levels) e.g. normal coverage, enhanced coverage level 1, enhanced coverage level 2, enhanced coverage level 3 and so on.

The second RAT may typically operate for supporting MTC capable UEs (e.g. category 0 UEs, category M1 UEs, NB-IOT UEs etc.). However in some embodiments certain type of MTC UEs (e.g. category 0, category M1 etc.) may operate with the first RAT (e.g. legacy LTE) whereas another type of MTC UEs (e.g. NB-IOT UEs) may operate based on the second RAT (e.g. NB-IOT). In some embodiments the second RAT may be a special case or special version or a variant of the first RAT. Thus is can use features of the first RAT, but may not implement all the features used by the first RAT. For example the second RAT may share or have certain characteristics of the first RAT. For example LTE (example of first RAT) and NB-IOT (example of second RAT) use the same multiple access schemes (e.g. OFDMA in DL and SC-FDMA in UL). In this example however the two RATs still differ in terms of their frame structures, channel bandwidth etc. The UEs of the second RAT may operate using a normal and extended coverage. In case of extended/enhanced coverage, the UE may be capable of operating under lower signal quality level (e.g. SNR, SINR, ratio of average received signal energy per subcarrier to total received power per subcarrier ($\hat{E}s/Iot$)), RSRQ etc) compared to its capabilities when operating in a legacy systems. The coverage level enhancement may vary with the operational scenario and may also depend on the UE type. For example, a UE which is located in a basement with bad coverage may need larger level of coverage enhancement (e.g. 10 dB) compared to a UE which is at a cell border (e.g. 5 dB).

The coverage level may be expressed in terms of:
received signal quality and/or received signal strength at the UE wrt its serving cell and/or
received signal quality and/or received signal strength at the serving cell wrt the UE.

Examples of signal quality are SNR, SINR, CQI, RSRQ etc. Examples of signal strength are path loss, RSRP, SCH_RP etc.

Consider an example of 2 coverage levels defined wrt signal quality (e.g. SNR) at the UE comprising of:
coverage enhancement level 1 (CE1) comprising of $SNR \geq -6$ dB at UE wrt its serving cell; and
coverage enhancement level 2 (CE2) comprising of $-12$ dB$\leq SNR < -6$ dB at UE wrt its serving cell.

Consider another example of 4 coverage levels comprising of:
coverage enhancement level 1 (CE1) comprising of $SNR \geq -6$ dB at UE wrt its serving cell;
coverage enhancement level 2 (CE2) comprising of $-12$ dBs$\leq SNR < -6$ dB at UE wrt its serving cell;
coverage enhancement level 3 (CE3) comprising of $-15$ dB$\leq SNR < -12$ dB at UE wrt its serving cell; and coverage enhancement level 4 (CE4) comprising of −18 dB≤SNR<−15 dB at UE wrt its serving cell.

In the above example the CE1 may also be interchangeably called as normal coverage level, baseline coverage level, reference coverage level, legacy coverage level etc. On the other hand CE2-CE4 may be termed as enhanced coverage or extended coverage level.

To realize enhanced coverage of the UE using the second RAT, the second network node may boost the transmit power on signals and/or apply repetition of signals (e.g., same signal is repeated in time and/or frequency resources) transmitted to and/or received from the UE. In some embodiments a term operating bandwidth (BW) is used. Over the operating BW the network node transmits to and/or receives signal from one or more UEs in a cell. The operating bandwidth is interchangeably called as channel bandwidth, system bandwidth, transmission bandwidth, cell bandwidth, cell transmission BW, carrier bandwidth etc. The operating BW may be expressed in different units. Examples of units are KHz, MHz, number of resource blocks, number of resource elements, number of subcarriers, number of physical channels, number of frequency resource units etc. The frequency channel or carrier frequency over which a RAT operates is enumerated or addressed by a channel number aka absolute radio frequency channel number (ARFCN) e.g. E-UTRA ARFCN (EARFCN) in LTE etc.

In some embodiments of this invention, the first network node operates using the first RAT over an operating bandwidth (Bw1) and transmits to and/or receives signals from one or more UEs using the first RAT in a first cell. An example of the first RAT is LTE. Examples of operating bandwidth (Bw1) are 1.4 MHz, 3 MHz, 5 MHz, 10 MHz, 15 MHz, 20 MHz etc. The second network node operates using the second RAT over an operating bandwidth (Bw2) wherein:

Bw2 is smaller than Bw1 i.e. Bw2<Bw1 and
Bw2 operates within Bw1

Examples of Bw2 are 200 KHz, one resource block, 12 subcarriers etc. The second network node may also operate using plurality of channels e.g. 2 or more channels each of 200 KHz.

The operation of the second RAT within the BW of the first RAT is also called as in-band operation, in-bandwidth operation etc. For consistency hereinafter we use the term in-band operation of the second RAT or simply in-band operation, which in turn herein implies that the second RAT operates within the part of the first RAT's BW (i.e. within Bw1). The embodiments are also applicable for operation of the second RAT within the guard-band of the carrier BW of the first RAT aka guard-band operation, guard-bandwidth operation etc. The difference between in-band and guard-band can be explained with the following example. Assume LTE (i.e. first RAT) operates in 10 MHz of carrier frequency (i.e. BW1=10 MHz). The guard band of 10 MHz LTE carrier frequency is 1 MHz in total (i.e. 0.5 MHz on each side of the carrier). The NB-IOT operation (i.e. second RAT) in any one or more resource blocks within the central 9 MHz (i.e. 50 RBs) is considered to be in-band operation of the second RAT. However the NB-IOT operation (i.e. second RAT) in any one or more resource blocks within the 1 MHz guard band (i.e. outside the central 9 MHz but within 10 MHz BW of the LTE) is considered to be guard-band operation of the second RAT. The guard band depends on the carrier bandwidth of the first RAT e.g. it is 2 MHz in total for 20 MHz channel BW.

The second network node may also transmit to and/or receive signals from one or more UEs using the second RAT in a second cell. The first and the second RATs are different. An example of the second RAT is an access technology operating using bandwidth narrower than the BW of the first RAT. For example Bw1 and Bw2 can be 10 MHz (i.e. 50 RBs) and 200 MHz (i.e. 1 RB) respectively.

In some implementation more than one network nodes may operate with the second RAT within the BW, Bw1, of the first RAT e.g. second and third network nodes may operate with the second RAT of bandwidth Bw2 and Bw3 within the bandwidth of the first RAT (i.e. Bw1). The BW parameters, Bw2 and Bw3, can be different (e.g. 200 KHz and 400 KHz respectively) or they can be the same (e.g. 200 KHz).

In some implementation more than one network node may operate within the BW, Bw1, of the first RAT, wherein each RAT may operate with different RAT. For example the second and third network nodes may operate with the second RAT of bandwidth, Bw2, and the third RAT of bandwidth, Bw3, within the bandwidth of the first RAT (i.e. Bw1). The BW parameters Bw2 and Bw3 can be different (e.g. 200 KHz and 400 KHz respectively) or they can be the same (e.g. 200 KHz).

For simplicity the embodiments are described for the case of two RATs but the embodiments are applicable for any number of RATs operating within the BW, Bw1, of the first RAT. The first and the second network nodes can be deployed using different deployment schemes. Examples of such schemes are:

- Both the first and the second network nodes are located in the same site (aka co-located network nodes);
- The first and the second network nodes are non-co-located i.e. they are physically separated;
- The first and the second network nodes are the same i.e. the same network node operates the first and the second RATs. In other words the same network node (e.g. the first network node) may serve UEs in the first cell and also another set of UEs in the second cell.

The first network node uses either a first scheme or a second scheme or both schemes in the first cell for allocating DL power for transmitting signals of the first RAT.

Method in a Network Node of Determining, Indicating, and Adapting Operations Due to an Existing Second RAT Method in a First Network Node of Determining and Indicating an Existing Second RAT in Operation Inside the Transmission Bandwidth of a First RAT In the first scheme, the method comprises the following steps:

1. A first network node or access node (e.g. node 100 of FIG. 1) determines that there is at least one second RAT (RAT2) operation within the operating bandwidth of RAT1 (BW1) in at least one cell (cell1);
2. signals to at least one first type of UE (UE1 or UE 200 of FIG. 3) an information indicating that there is another RAT2 (e.g. NB-IOT) in operation (in-band, or guard band) in BW1. The information may further comprise of one or more of the following:
   a. the radio resources used for RAT2 operation in at least cell1 e.g. symbols, slots, resource element, subcarriers, RBs, subframes, frames etc.;
   b. the type of signals which may be used by UE1 for one or more operations but they are not transmitted in radio resources used by RAT2 e.g. CSI-RS, PRS, MBSFN RS, DRS, PSSS, SSSS, S-DMRS, SRS etc. In this case UE2;
   c. information indicating whether the operation in the indicated radio resources is considered an in-band operation or guard-band operation. For example RAT2 operating in a RB used close to or at the boundary between transmission BW and the guard band within BW1, may be considered either in-band or guard band depending on the radio emission characteristics of the first radio network node. For example if the base station serving RAT1 is able to suppress radio emission below a threshold then this may be considered as guard-band operation.

Figure 4:
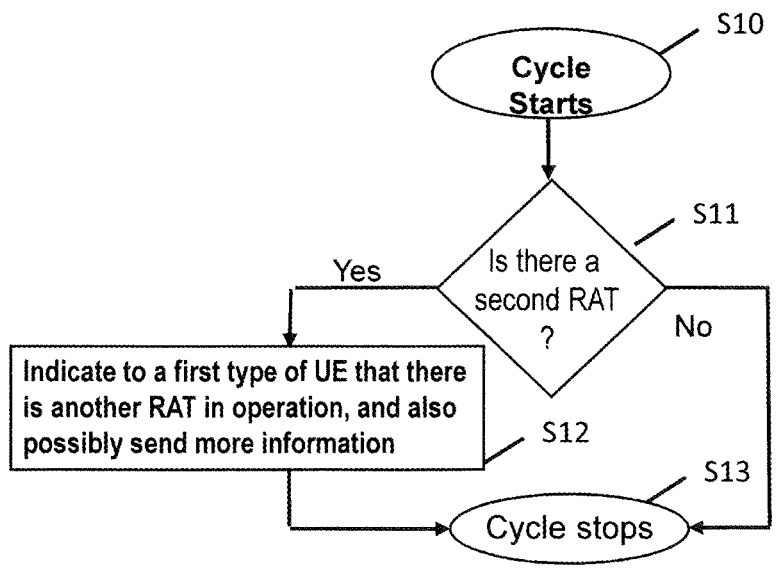
FIG. 4 shows an example flowchart of a method carried out by a first user entity operating with the first access technology and which checks whether another user entity operating with another access technology is present in the frequency bands used by the first user entity.

This is further elaborated in connection with FIG. 4. The method starts in step S10 and in step S11 the network node or access node checks whether there is another access technology present in the cell. If another radio access technology is detected, this information is transmitted to, UE1 such as it user entity 200 shown in FIG. 1.

In step S12 the access node such a access node 100 of FIG. 3 informs user entity 200 of the fact that there is another access technology operating, especially that there is another access technology in the bandwidth of the carrier frequency with which the access node 100 communicates with the user entity 200. The access node 100 may include further information into the message transmitted to user entity 200 as will be explained in further detail below. The method ends in step S13. If it is detected in step S11 that there is no further access technology operating in the bandwidth of the access technology used by access node 100, the method directly ends in step S13.

The step S11 is further elaborated with the following examples. In one example the first network node e.g. access node 100 of FIG. 3 may determine the RAT2 operation within BW1 on at least cell1 by retrieving from its memory the information related to the resources assigned or reserved for RAT2. In another example the first network node may determine the RAT2 operation within BW1 on at least cell1 by receiving an indication from another network node, which contains information about resources used for at least RAT2 within BW1. In yet another example the first network node may determine the RAT2 operation within BW1 on at least cell1 by receiving an indication from scheduler which contains which contains information about resources assigned or scheduled for at least RAT2 within BW1. In yet another example the first network node may determine the RAT2 operation within BW1 on at least cell1 by observing the characteristic of signals received and/or transmitted for RAT2 operation within BW1. For example the RAT2 operation is assumed in a radio resource when the transmitted and/or received signal characteristic in that radio resource matches with certain pre-defined RAT2 signals.

Step S12 is further elaborated with the following examples. In one example the signaled information may be expressed in terms of one or more radio resource identifiers of radio resources in time and/or frequency e.g. RAT1 RB number # 10 in RAT1 subframe # 1, RAT1 RB number # 10 in every RAT1 subframe etc. In another example the signaled information may be expressed in terms of one or more RB identifiers (e.g. RB# 12) whereas the subframe number(s) may be pre-defined.

The first network node may determine the type of signals which are not transmitted in UL and/or DL in radio resources used for RAT2 within BW1 on at least cell1 based on the following sets of information:
  radio resources configured for performing RAT2 operation (as described above);
  one or more radio operations or procedures being performed or expected to be performed by UE1 on reference signals which can be transmitted in radio resources used by RAT2 within BW1.

For example the first network node may determine the radio operations performed by the UE1 by determining the measurement configuration information sent to UE1 by the first network node or by another network node e.g. positioning network node to the UE1 for performing positioning measurements such as OTDOA RSTD, E-CID UE Rx-Tx time difference etc.

The UE1 may perform one or more radio operations on more than one cell on f1 e.g. on serving cell and one or more neighbor cells. Therefore in some embodiments the first network node may further determine the information about radio resources used for RAT2 operation within BW1 on plurality of cells on f1. For example the information may be determined for the serving cell and one or more neighbor cells on f1 in case the radio operation is performed by UE1 on plurality of cells on f1 e.g. OTDOA positioning measurements such as RSTD, RSRP measurements on cells of f1 etc. In yet another example the information may be determined for one or more neighbor cells on f1. The radio resources used for the RAT2 operation within BW1 on f1 may be:
  the same on all cells on f1 or
  different on different cells on f1 or
  the same on certain number of cells but different on remaining cells.

The information related to radio resources used for RAT2 operation for the plurality of cells on f1 may be signaled to UE1 in any of the following manner:
  In one exemplary embodiment the first network node may signal information related to radio resources used for RAT2 operation separately for each of the plurality of cells on f1. In this case each set of information can be associated with the identifier of the corresponding cell; therefore cell IDs are also signaled for each cell along with the radio resource information. This type of information may be signaled in case only subset of cells use RAT2 operation on f1 and/or when radio resources are not the same on at least subset of cells using RAT2 operation on f1;
  in a second exemplary embodiment the first network node may signal one set of combined or composite information related to radio resources used for RAT2 operation separately for the plurality of cells on f1. For example the signal information may indicate all radio resources (e.g. IDs of all RBs) used for RAT2 operation on cells of f1 without indicating the cell IDs of the corresponding cells. In this case the UE1 may assume that all the indicated radio resources in the combined information for RAT2 operation on all the cells on f1. This type of information may be signaled in case at least subset of cells use same radio resources for RAT2 operation on f1;
  in a third exemplary embodiment the first network node may signal information related to radio resources used for RAT2 operation on a reference cell (cell1) on f1 and also indicate whether the radio resources used on other cells on f1 for RAT2 operation are the same or different compared to the radio resources used on the reference cell, cell1. The cell1 may typically be the serving cell of the UE; however it may also be a neighbor cell.

Figure 5:
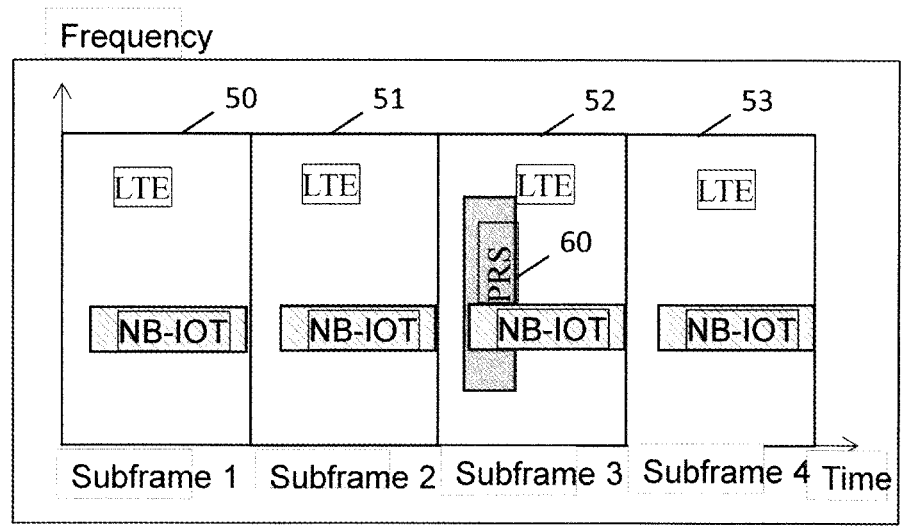
FIG. 5 shows an example of an in band NB-IOT, where it collides with resources used in another access technology such as LTE.

FIG. 5 illustrates an example of the case where RAT2 is a NB-IOT and is deployed inside the bandwidth of RAT1 which is LTE. This means that all traffic data and also reference signals in LTE are replaced by the NB-IOT signal in one resource block (shaded area) used for NB-IOT on at least cell1 on f1 This applies to all resource blocks 50 to 53 shown in FIG. 5. In the example shown in resource block 52 the NB-IOT information would collide with the resources used for PRS in LTE. In this example the LTE network node indicates to the UE (i.e. UE1 or UE 200 or FIG. 3) in cell1 that there is an ongoing NB-IOT operation inside the bandwidth of the LTE that affects measurements based on PRS by UE1. Similar information for RAT2 operation may be signaled for radio resources used for RAT2 operation on plurality of cells on f1.

In the following a method in a first network node of adapting its procedures based on operation of an existing second RAT is discussed.

According to this aspect of the method, the first network node (e.g. eNB) uses the information about an operation of the second RAT within BW1 for one or more tasks e.g.

adapts one or more procedures and configurations relate to RAT1 operation in order to minimize the impact on RAT1 operation due to RAT2 operation within BW1. Examples of such adaptations are:

configuring the radio resources used for transmitting reference signals (e.g. CRS, CSI-RS, PRS, MBSFN RS, SRS), or other control or data channels to avoid collision with radio resources used by a second RAT. For example the first network node may avoid configuring UL signals such as SRS used for RAT1 operation in radio resources used for RAT2 operation.

Adapts one or more parameters related to measurement configurations sent to UE1 for performing one or more measurements in order to minimize the impact on RAT1 operation due to RAT2 operation within BW1. Examples of such parameters are configuring the UE1 to send measurement reports, measurement results etc. in resources which do not collide with radio resources used by RAT2 operation.

Adapts one or more measurement procedures used by the first network node for performing one or more measurements related to RAT1 on at least uplink radio signals sent by the UE1. For example the first network node when performing an UL radio measurement (e.g. SINR, base station Rx-Tx time difference) does not use any signal received in radio resources used for RAT2 operation. In another example the first network node may apply compensation to the UL measurements in case some of the UL signals related to RAT1 are not used or cannot be used in radio resources due to RAT2 operation; the compensation may comprise of using additional UL signals for UL measurements in radio resources available for RAT1 operation.

Figure 6:
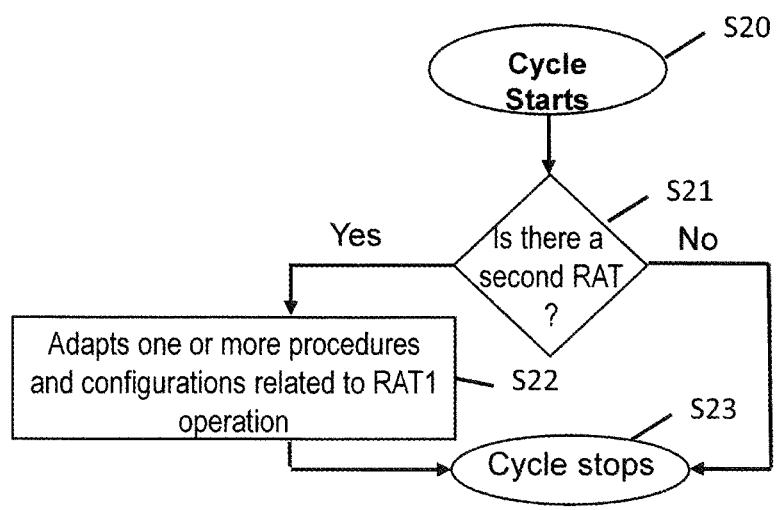
FIG. 6 shows an example flowchart of a method carried out by a first access node shown in FIG. 3 which adapts its operation in view of a presence of another user entity operating with a second access technology in the same cell.

The steps carried out the first access node are summarized in FIG. 6. The method or cycle starts in step S20 and in step S21 the second access technology is detected as discussed above in step S11. In step S22, the operation of the access node is adapted as discussed above. The method ends in step S23.

In the following a method in a second network node, such as node 300 of FIG. 3, of determining and indicating the operation inside the bandwidth of a first RAT will be discussed in more detail.

According to this method in a second network node, such as access node 300 of FIG. 3, the second NW node (NW2) may also signal to at least one second type of UE (UE2) operating using RAT2 (e.g. NB-IOT) that RAT2 is operating over bandwidth (BW2) in at least a second cell (cell2) within the bandwidth (BW1) of another RAT1 (e.g. LTE), where BW2 is larger than BW1. For example BW2 comprises of 200 KHz (e.g. 1 RB) and BW1 comprises of 10 MHz (e.g. 50 RBs). The method comprises of the following main steps:

1. A second network node (NW2 or node 300 of FIG. 3) determines that it is operating over BW2 at least in cell2 (cell 310 within the operating bandwidth of RAT1 (BW1).
2. The second network node (NW2 or node 300) signals to at least one second type of UE (UE2 or UE 400 of FIG. 3) that it is operating inside the channel bandwidth (in-band, or guard band) of a first RAT (RAT1). The information may further comprise
 a. the radio resources used for RAT1 operation e.g. bandwidth, power, RBs, subframes etc.;
 b. indication whether or not any signal related to RAT1 is transmitted in radio resources used for RAT2 operation. The indication may also contain more detailed information such as:
  i. the type of signals associated with RAT1 are transmitted in radio resources used by RAT2. For example it may be indicated that CRS that belongs to RAT1 are punctured (i.e. not transmitted) in the resources used for RAT2. An indication whether CRS related to RAT1 (e.g. LTE) are transmitted in resource block used for RAT2 (e.g.NB-IOT). An indication that whether certain resource elements in resource block used for RAT2 contain signals (e.g. PRS) for RAT1 operation;
 c. information indicating whether the operation in the indicated radio resources is considered an in-band operation or guard-band operation. For example RAT2 operating in a RB used close to or at the boundary between transmission BW and the guard band within BW1, may be considered either in-band or guard band depending on the radio emission characteristics of the first radio network node. For example if the base station serving RAT1 is able to suppress radio emission below a threshold then this may be considered as guard-band operation.
3. The second network node may also adapt transmission and/or reception of one or more radio signals related to RAT2. For example NW2 may boost transmit power of RAT2 related reference signals in cell2. In another example NW2 may use more robust receiver to receive RAT2 related radio signals from UE2 in cell2; more robust receiver will enable NW2 to reduce or eliminate interference caused by emissions due to RAT1 signals while receiving RAT2 signals.

In one example the second network node may determine that RAT2 operates on at least cell2 over BW2 within BW1 of RAT1 by retrieving from its memory the information related to the resources assigned or reserved for RAT2 on carrier frequency, f1, within BW1. In yet example the second network node may determine that RAT2 operates on at least cell2 within BW1 of RAT1 by estimating or observing that signals outside BW2 but within BW1 are different than that of RAT2.

Typically plurality of cells of RAT1 may operate over BW1 on f1. The RAT2 may operate within BW1 of RAT1 in one specific cell (i.e. cell2) or in plurality of cells depending on the coverage/traffic demand of RAT2 in the network.

Therefore second network node may further determine whether one or plurality of cells of RAT2 operates within BW1 of RAT1 on carrier, f1. In one example all cells of RAT2 may operate within the same BW1 of f1. In another example some of the cells of RAT2 may operate within BW1 of f1, whereas some cells of RAT2 may operate within BW1 of f1. The second network node may determine this information by receiving this from another network node having this information and/or pre-defined configuration of RAT2 operation in different cells within BW1. The second network node may further signal to at least UE2, the information about RAT2 operation on plurality of cells within BW1 on f1. For example the information may comprise of cell ID of each cell with RAT2 operation and carrier BW of RAT1 within which RAT2 operates.

Figure 7:
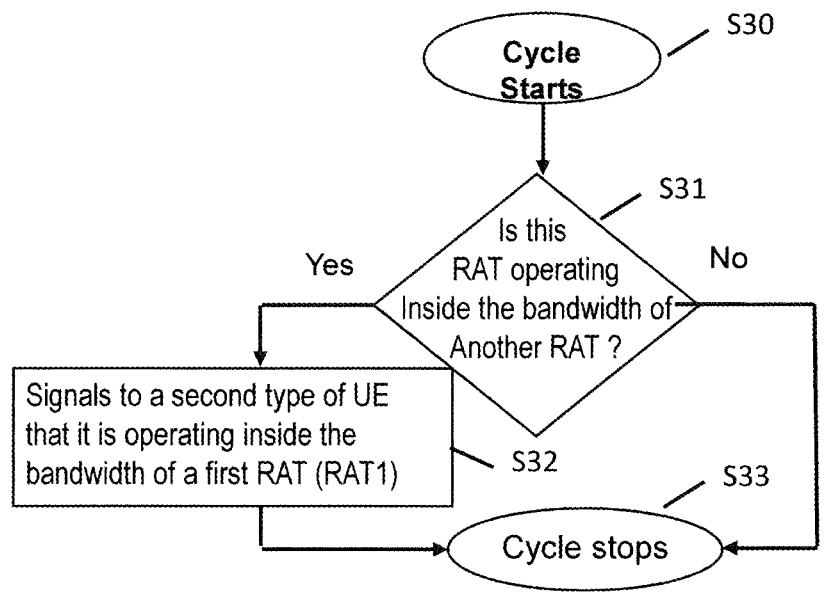
FIG. 7 shows an example flowchart of a method carried out by a second access node shown in FIG. 3 and which operates in accordance with a second access technology.

This is summarized by FIG. 7. The second network node starts the method of cycling step S30 and in step S31 it is checked whether the network node operates inside the bandwidth of another radio access technology. Applied to FIG. 3 this means that access node 300 checks whether it operates in the area or cell of access node 100. If this is the case it informs the second user entity such as user entity 400 of FIG. 3 that is operating inside the bandwidth of the first access technology used by access node 300 (step S32). The method or cycle ends in step S33.

In the following the two user entities involved in the above described method will be discussed in more detail.

A Method in a UE will be discussed which receives information about an existing second RAT inside the bandwidth of a first RAT. The adapting of the UE procedures will be discussed below.

First a method in a UE (such as UE 200 of FIG. 3) to receive information about at least a second RAT (RAT2) is discussed and the adaptation of its operation.

One schema is the method in a UE1 operating with a first RAT (RAT1) which comprises the steps of:
1. receiving from a first network node information about a second RAT operation in at least a first cell (cell1) on radio resources within the bandwidth of RAT1 (i.e. BW1);
2. using the received information for adapting one or more of the following tasks or procedures:
   a. adapting one or more operations related to at least cell1 involving at least some radio resources (e.g. slots, subframes, RBs etc.) which are used for RAT2 operation within BW1. For example UE1 may avoid listening and/or using certain type of signals (e.g. CSI-RS, PRS and MBSFN reference signals, SRS etc.) transmitted or expected to be transmitted or can be transmitted in such radio resources,
   b. applying compensation to account for errors in case it uses any signal related to RAT2 during resources where RAT2 is used,
   c. adapting its measurement procedures based on operation of an existing second RAT. For example UE1 in a first RAT (e.g. eNB) adapts the measurement intervals or measurement reporting, due to collision of some reference signals of a the first RAT and radio resources in a second RAT.

The UE1 may receive separate information for RAT1 and RAT2 operations in uplink and downlink for the same respective cells (i.e. cell1 and cell2). The UE1 may further receive information about radio resources used for RAT2 operation within bandwidth of RAT1 in plurality of cells of the first carrier, f1. The UE1 may further use this information for adapting one or more tasks in plurality of cells. For example the UE1 may apply compensation on the RSRP and/or RSRQ measurements on plurality of cells where RAT2 operates in at least one radio resource e.g. RB. The compensation may comprise of applying a fixed signal offset to the measurement results. The signal offset may correspond to the total expected received power from RAT1 related reference signals which are not transmitted in the radio resource(s) used for RAT2 within BW1.

In the example of FIG. 5 a UE1 that is served by the LTE cell (i.e. RAT1) and performs positioning measurements based on PRS, receives information about the second RAT and can adapt its operation by e.g. skipping measurements on those resources that are used by the NB-IOT, as PRS in this case is punctured and replaced by the NB-IOT.

In the following a method in a UE (such as UE 400 of FIG. 3) to receive information about the first RAT (RAT1) and adapt one or more of its operation is discussed.

One scheme is the method in a UE2 operating with a second RAT (RAT2) comprising the steps of:
1. receiving from a second network node information that the second RAT in at least a second cell (cell2) operates on radio resources within the bandwidth (BW1) of the carrier frequency of a first RAT. The received information may further comprise of one or more:
   a. Bandwidth of RAT1 (BW1);
   b. RAT1 carrier frequency information e.g. carrier frequency channel number, ARFCN, UARFCN etc.
   c. whether or not any signal related to RAT1 is transmitted within the bandwidth of RAT2 (BW2);
   d. information about specific signals related to RAT1 transmitted within BW2 e.g. CRS related to LTE are transmitted in BW2, transmit power of CRS etc.;
   e. transmit power of one or more radio resources used for RAT1 e.g. RAT1 radio resources (e.g. resource blocks) which are to adjacent to RAT2 radio resources (e.g. RAT2 RBs) in frequency domain etc.
2. using the received information for adaptation of one or more tasks or operations or procedures. Examples of adaptation of such procedures are:
   a. adaption of transmission power when transmitting RAT2 signals to account for RAT1 operation e.g. transmitting with transmit power below a threshold to lower interference towards RAT1;
   b. use more robust transport format (TF) to reduce or avoid or minimize interference towards RAT1 i.e. interference caused due to leakage of RAT2 signals. Example of more robust TF is modulation and coding scheme (MCS) comprising of QPSK modulation and code rate of ½ or ⅓;
   c. avoiding listening and/or using signals (e.g. CSI-RS, PRS and MBSFN reference signals, SRS etc.) which are transmitted or expected to be transmitted or can be transmitted in radio resources within RAT2 bandwidth;
   d. applying compensation to the received signals account for errors in case UE2 uses any signal related to RAT1 within BW2. For example UE2 may apply fixed compensation (e.g. x dB) to the received SINR or SNR; value of X depends on the extent of errors;
   e. adapting measurement procedures based on operation of RAT2 within BW1. For example UE2 adapts the measurement intervals or measurement reporting, due to interference caused by RAT1 in RAT2 signals and/or due to transmission of certain RAT2 signals (e.g. CRS) within BW2. For example UE2 may extend the measurement period of radio measurement (e.g. RSRP) above a threshold when RAT2 operates within BW1. In yet another example the adaptation may comprise of using more measurement samples (e.g. samples above a threshold such as more than 5 samples) within the measurement period of a radio measurement.

The UE2 may further receive separate information for RAT1 and RAT2 operations in uplink and downlink for the same respective cells (i.e. cell1 and cell2). The UE2 may further receive information about radio resources used for RAT2 operation within bandwidth of RAT1 in plurality of cells of the first carrier, f1. The UE2 may further use this information for adapting one or more tasks in plurality of cells. For example the UE2 may apply compensation on the radio measurements (e.g. RSRP and/or RSRQ measurements) on plurality of cells where RAT2 operates in at least one radio resource e.g. RB of the BW of RAT1. The compensation may comprise of extending the measurement period of one or more radio measurements (e.g. RSRP, RSRQ etc.) above a threshold when RAT2 operates within BW1 of the measured cell.

In the following a method will be discussed how a UE signals its capabilities of adapting its operation to the network node.

According to one aspect of this embodiment a UE1 operating with a first RAT that is capable of adapting one or more radio operational tasks or procedures when a second RAT operations within the bandwidth of RAT1 (BW1) as described above, may inform the network node that it supports such capability. This capability information can be used by the network node to signal to the UE1 to change or adapt its procedures accordingly (e.g. performing OTDOA measurements on other resources, etc.). The network node may further use this received capability information for adapting or more procedures as described above. The UE1 may send the capability information to the network node either without receiving any explicit request from the network node, or upon receiving an explicit request from the network node.

According to another aspect of this embodiment a UE2 operating with a second RAT that is capable of adapting one or more radio operational tasks or procedures when a second RAT operations within the bandwidth of RAT1 (BW1) as described above, may inform the network node that it supports such capability. This capability information can be used by the network node to signal to the UE2 to change or adapt its procedures accordingly (e.g. performing OTDOA measurements on other resources, etc.). The network node may further use this received capability information for providing information about RAT2 operation within BW1 as described above. The UE2 may send the capability information to the network node either without receiving any explicit request from the network node, or upon receiving an explicit request from the network node.

Figure 8:
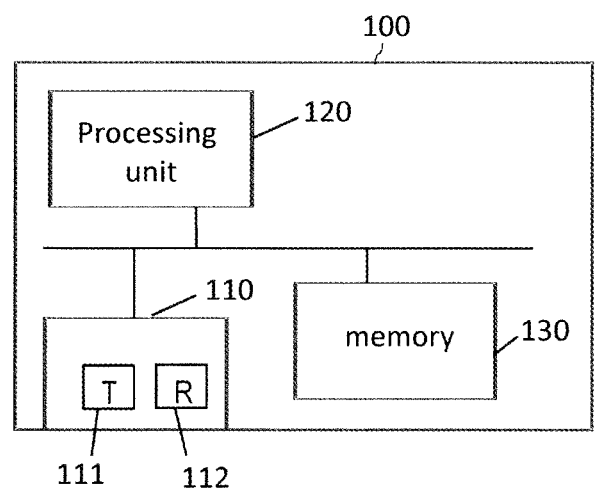
FIG. 8 shows an example schematic representation a first access node shown in FIG. 3 which is communicating with the first user entity using a first access technology.

FIG. 8 is a schematic illustration of an access node 100. The access node comprises an interface 110 comprising a transmitter 111 and a receiver 112, the interface 110 being used for the communication with other network nodes or other entities inside or outside the network e.g. such as entities 200, 300 and 400 shown in FIG. 3. Transmitter 111 represents the possibility to transmit user data or control messages to other entities, receiver 112 symbolizing the possibility to receive user data or control messages from other entities. Furthermore, a processing unit 120 is provided, e.g. a multicore processor. The processing unit 120 is responsible for the operation of the access node. The access node 100 furthermore comprises a memory 130. The memory may store a program code that can be executed by the processing unit 120. Executing the program code can cause the access node 100 or the processing unit 120 to perform techniques described above or below in which the access node is involved.

Figure 9:
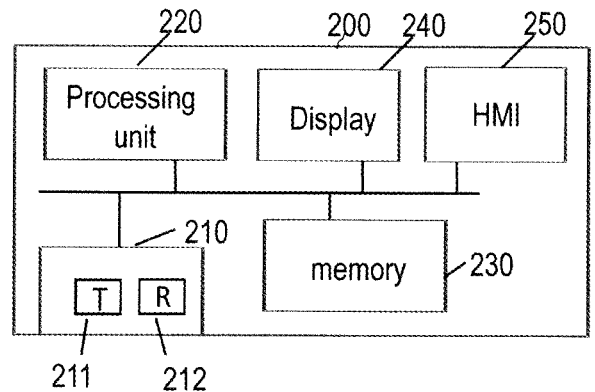
FIG. 9 shows an example schematic representation of a first user entity which is in communication with the first access node of FIG. 8 using the first access technology.

FIG. 9 shows a schematic illustration of a user entity 200. The user entity 200 comprises an interface 210 used for communication with other entities or nodes inside and outside the network. Transmitter 211 symbolizes the possibility to transmit user data or control messages to other entities, the receiver 212 symbolizing the possibility to receive messages from other nodes or entities. Receiver 212 may receive the messages issued by access node 100 as discussed above. The user entity furthermore comprises a processing unit 220 controlling the operation of the user entity 200. A memory 230 is provided storing a program code that can be executed by the processing unit 220. Executing the program code can cause the responding entity 200 to perform techniques described above or below in which the user entity is involved. User entity 200 can furthermore comprise a display 240 to display information for a user and a Human Machine Interface 250 used by the user to control the user entity 200. The HMI 250 can be part of the display 240 when the latter is touch sensitive.

Figure 10:
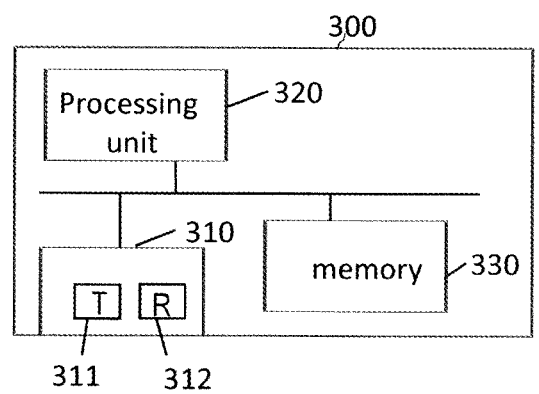
FIG. 10 shows an example schematic representation of a second access node shown in FIG. 3 which is in communication with a second user entity using a second access technology.

FIG. 10 shown a schematic view of access node 300 which operates with the second access technology. The access node comprises an interface 310 comprising a transmitter 311 and a receiver 312, the interface 310 being used for the communication with other network nodes or other entities inside or outside the network e.g. such as entities 100, 200 and 400 shown in FIG. 3. Transmitter 311 represents the possibility to transmit user data or control messages to other entities, receiver 312 symbolizing the possibility to receive user data or control messages from other entities. Furthermore, a processing unit 320 is provided, e.g. a multicore processor. The processing unit 320 is responsible for the operation of the access node. The access node 300 furthermore comprises a memory 330. The memory may store a program code that can be executed by the processing unit 320. Executing the program code can cause the access node 300 or the processing unit 320 to perform techniques described above or below in which the access node is involved.

Figure 11:
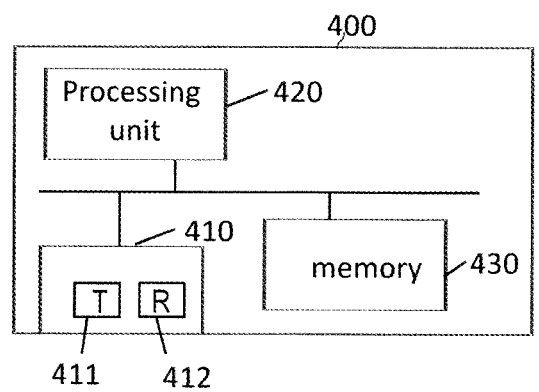
FIG. 11 shows an example schematic presentation of the second user entity which is in communication with the second access node of FIG. 10 using the second access technology.

FIG. 11 shows a schematic illustration of a user entity 400 of FIG. 3. The user entity 400 can be a NB-IOT entity and comprises an interface 410 used for communication with other entities or nodes inside and outside the network. Transmitter 411 symbolizes the possibility to transmit user data or control messages to other entities, the receiver 412 symbolizing the possibility to receive messages from other nodes or entities. Interface 410 is configured to operate in accordance with the second access technology different from the first access technology used by access node 100. Receiver 412 may receive the messages issued by access node 300 as discussed above. The user entity furthermore comprises a processing unit 420 controlling the operation of the user entity 400. A memory 430 is provided storing a program code that can be executed by the processing unit 420. Executing the program code can cause the responding entity 400 to perform techniques described above or below in which the user entity is involved.

Figure 12:
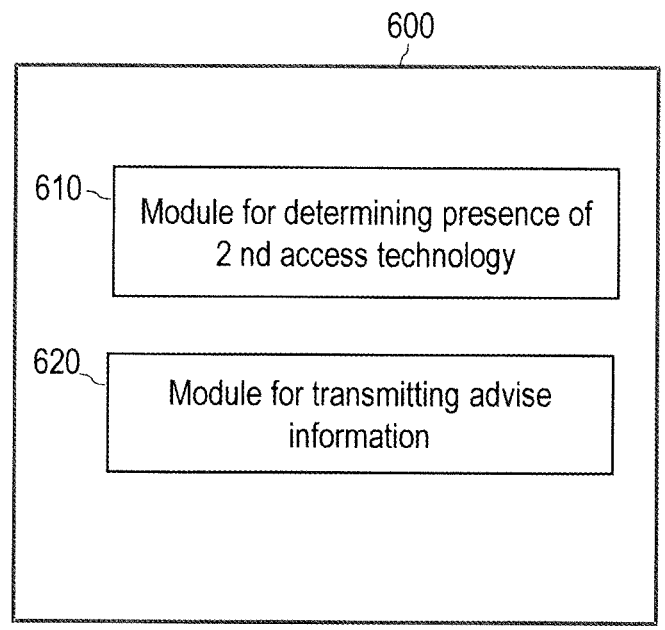
FIG. 12 shows a further example of a first access node corresponding to the access node of FIG. 3.

FIG. 12 shows a further example of a first access node. The first access node 600 comprises a module 610 for determining a presence of the second access technology meaning that it is determined that a second user entity or a second access node using the second access technology is operating in the first cell were the first access node is present. Furthermore, a module 620 is provided for transmitting the advice information to the first user entity by which the first user entity is informed about the fact that the second user entity or second access node is operating in the first cell within the bandwidth of the first carrier frequency.

Figure 13:
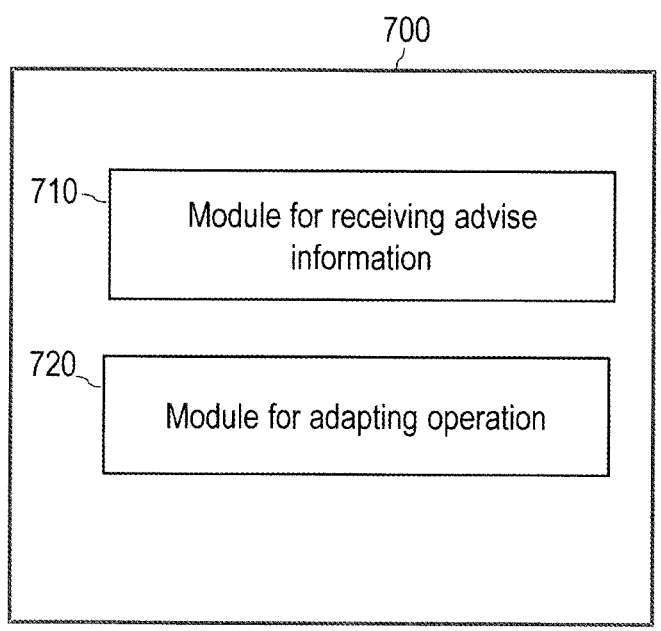
FIG. 13 shows a further example of a first user entity which is in communication with the first access node using the first access technology.

FIG. 13 shows a further example of a first user entity 700 which comprises a module 710 for receiving the advice information from the first access node that the second user entity or second access node are present using the second access technology. Furthermore, a module 720 is provided for adapting the operation of the first user entity in order to maintain the operation in the first cellular network in accordance with the first access technology.

Figure 14:
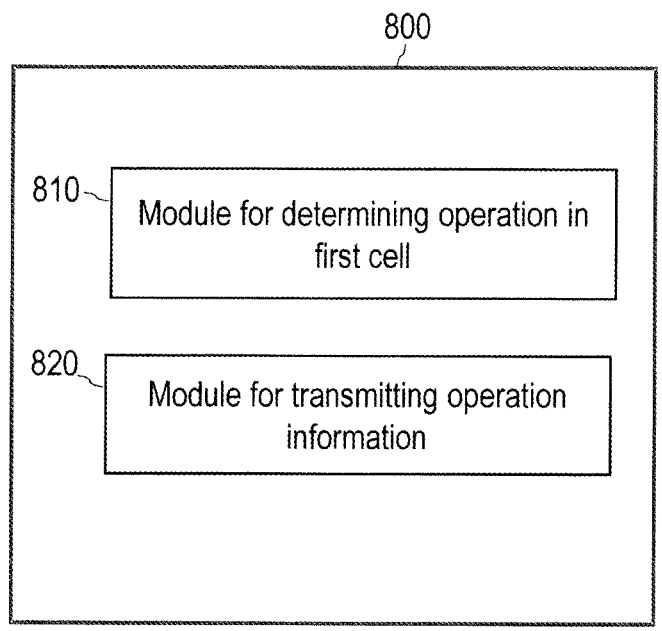
FIG. 14 shows a further example of a second access node corresponding to the access node of FIG. 3.

FIG. 14 shows a further example of the second access node 800 which comprises a module 810 for determining that the second access node or second user entity operates in the first cell were the first access technology is used with the at least one first carrier frequency, with the operation of the second access node being within the bandwidth of the at least one first carrier frequency. Furthermore, a module 820 is provided for transmitting operation information to the second user entity, by which the second user entity is informed that the second access node is operating in the first cell.

Figure 15:
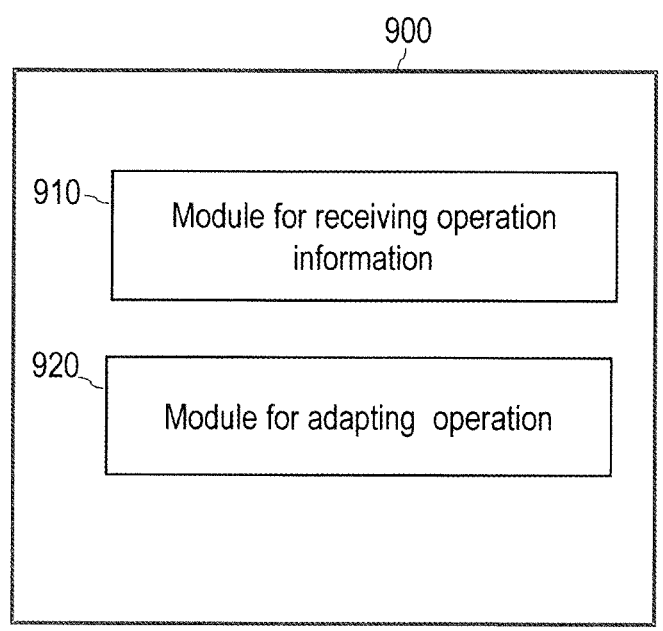
FIG. 15 shows a further example of a second user entity which is in communication with the second access node using the second access technology.

FIG. 15 shows a further embodiment of a second user entity 900 which comprises a first module 910 for receiving operation information from the second access node by which the second user entity is informed that the second access node or the second user entity is operating in the first cell with a first carrier frequency. Furthermore, a module 920 is provided for adapting the operation of the second user entity taking into account the received operation information.

From the above said some general conclusions can be drawn:

As far as the first access node 100 is concerned, a method can be provided for operating a first access node 100 of a first cellular network in which a first user entity 200 uses a first access technology with at least one first carrier frequency to access a first cell 110 of the first cellular network, the at least one first carrier frequency having a bandwidth, the method comprising:
- determining that a second user entity 400 or a second access node 300 using a second access technology different from the first access technology may operate in the first cell 110 within the bandwidth of the at least one first carrier frequency in order to access a second cellular network,
- transmitting advise information to the first user entity 200 by which the first user entity is informed about the fact that the second user entity 400 or second access node may operate in the first cell within the bandwidth of the at least one first carrier frequency using the second access technology.

As far as the first access node is concerned a method may be provided comprising the step of
- determining that a second user entity 400 or a second access node 300 using a second access technology different from the first access technology may operate on radio resources within the bandwidth of the at least one first carrier frequency in order to access a second cellular network,
- transmitting information to the first user entity by which the first user entity is informed about the fact that the second user entity 400 or second access node may operate within the bandwidth of the at least one first carrier frequency.

Furthermore, the first access node may operate in such a way that it determines that a second user entity 400 or a second access node 300 using a second access technology different from the first access technology may operate within the bandwidth of the at least one first carrier frequency of the first cell 110 in order to access a second cellular network. The information is then transmitted as mentioned in the preceding paragraph.

Furthermore, the operation of the first access node may be adapted in order to enable the operation of the second user entity 400 using the second access technology in the first cell within the bandwidth of the at least one first carrier frequency. An adaptation of the first signals exchanged with the first mobile entity using the first access technology may be such that an overlap with second signals exchanged between the second user entity 400 and the second access node 300 using the second access technology is minimized. As an alternative, or in addition the reception of the first reception signals received from the first mobile entity 200 using the first access technology is adapted.

The information, e.g. advise information can comprise information about radio resources used by the second access technology in the first cell. The advice information can furthermore comprise information how second signals exchanged in accordance with the second access technology differ from first signals exchanged in accordance with the first access technology. Furthermore, the advice information can comprise information whether the operation of the second user entity 400 within the bandwidth of the at least one carrier frequency using the second access technology is an in-band operation or a guard band operation.

The information, advise information, can comprise information about radio resources used by the second access technology in the first cell 110, and/or information how second signals exchanged in accordance with the second access technology differ from first signals exchanged in accordance with the first access technology.

The information can additionally comprise information whether the operation of the second user entity 400 within the bandwidth of the at least one first carrier frequency using the second access technology is an in-band operation or a guard band operation.

The step of determining that the second user entity 200 using the second access technology within the bandwidth of the at least one first carrier frequency can comprise at least one of:
- determining radio resources used by the second access technology from a memory of the first access node 100,
- receiving an indication from another network node of the first network indicating radio resources used by the second access technology.
- observing signals received within the bandwidth of the at least one first carrier frequency such that it can be deduced form the observed signals that they are transmitted in accordance with the second access technology.

A method can be provided for operating a first user entity 200 which uses a first access technology with at least one first carrier frequency to access a first access node 100 in a first cell 110 of a first cellular network, the at least one first carrier frequency having a first bandwidth, comprising:
- receiving advise information from the first access node 100 by which the first user entity 200 is informed that a second user entity 400 or second access node 300 using a second access technology different from the first access technology may operate in the first cell 110 within the bandwidth of the at least one first carrier frequency in order to access a second cellular network,
- adapting an operation of the first user entity 200 in order to maintain the operation in the first cellular network in accordance with the first access technology while the second user entity 400 or second access node operates within the bandwidth of the at least one first carrier frequency using the second access technology.

The operation of the first user entity 200 may be adapted in reaction to the received advice information. It is possible to adapt a use of radio resources of the first access technology in such a way that a predefined signal transmitted in accordance with the first access technology is avoided in a second carrier frequency used by the second access technology within the bandwidth of the at least one first carrier frequency. The adaptation can furthermore comprise the step of applying compensation to signals transmitted in accordance with the first access technology within the second carrier frequency in order to account for errors occurring due to a presence of second signals exchanged in accordance with the second access technology within the bandwidth of the at least one first carrier frequency.

Additionally the adaptation may comprise an adaptation of measurement procedures carried out by the first user entity 200 using the first access technology for exchanging information with the first access node 100. Furthermore, it is possible to adapt a communication with a plurality of first cells of the first cellular network.

As far as the operation of the second access node 300 is concerned, a method can be provided for operating a second access node 300 of a second cellular network, in which a second user entity 400 uses a second access technology with at least one second carrier frequency to access the second access node of a second cell 310 of the second cellular network, comprising:

determining that the second access node 300 or second user entity may operate in a first cell 110 of a first cellular network, in which a first user entity 200 uses a first access technology with at least one first carrier frequency to access the first cell 110 of the first cellular network, the at least one first carrier frequency having a corresponding bandwidth, wherein the operation of the second access node 300 in the first cell is within the bandwidth of the at least one first carrier frequency, transmitting operation information to the second user entity 400 by which the second user entity is informed that the second access node 300 or second access node is operating in the first cell 110 in accordance with the second access technology within the bandwidth of the at least one first carrier frequency.

The second access node can determine that the second access node or second user entity is operating in the second cell on radio resources within the bandwidth of the first carrier frequency.

Furthermore, the operation of the second access node 300 with the second access technology may be adapted in order to enable operation of the second access node 300 with the second access technology within the bandwidth of the at least one first carrier frequency.

Additionally a transmission or reception of radio signals of the second access technology may be adapted.

When the second access node 300 transmits information, e.g. operation information, the second access node may transmit information about radio resources used by the first access technology in the first cell. The information can furthermore comprise information whether the first signals exchanged in accordance with the first access technology are transmitted in radio resources used by the second access technology. The information can furthermore comprise information whether the operation of the second user entity 400 using the second access technology within the bandwidth of the at least one first carrier frequency is an in-band operation or a guard band operation.

Furthermore, the second access node may receive from the second user entity 400 capability information, said capability information indicating that the second user entity is capable of adapting one or more procedures when operating in the second cell within the bandwidth of the at least one first carrier frequency.

The transmitted information can furthermore information indicating whether the operation is considered an in-band or guard band operation.

Furthermore, the same network node can act as first and second access node.

A method can be provided for operating a second user entity 400 which uses a second access technology with at least one second carrier frequency to access a second access node 300 in a second cell 310 of the second cellular network, comprising:

receiving operation information from the second access node 300 by which the second user entity 400 is informed that the second access node or the second user entity is operating in a first cell 110 of a first cellular network, in which a first user entity 200 uses a first access technology with at least one first carrier frequency to access the first cell 110 of the first cellular network, the at least one first carrier frequency having a bandwidth, wherein the operation of the second access node 300 in the first cell in accordance with the second access technology is within the bandwidth of the at least one first carrier frequency, adapting the operation of the second user entity 400 taking into account the received operation information such that an interference with signals exchanged in accordance with the first access technology is at least reduced.

As far as the second user entity 400 is concerned, the operation may be adapted such that an interference with signals exchanged in accordance with the first access technology is at least reduced.

The second user entity may inform the second access node 300 about the fact that the operation of the second user entity 400 has been adapted. As discussed above the second user entity 400 can receive information, e.g. operation information, from the second access node by which the second user entity is informed that the second access node 300 or the second user entity 400 is operating in the first cell. The received information can comprise information about the bandwidth of the at least one first carrier frequency and/or information about the at least one first carrier frequency. Additionally information may be provided whether first signals exchanged in accordance with the first access technology are transmitted in radio resources used by the second access technology. A further possible piece of information comprised in the received operating information can be information about predefined first signals exchanged in accordance with the first access technology and transmitted within the second bandwidth of the second carrier frequency or information indicating whether the operation is considered an in-band or guard band operation.

The operation of the second user entity 400 may be adapted such that a use of radio resources of the second access technology is adapted in such a way that an interference level occurring due to second signals transmitted in accordance with the second access technology in the at least one first carrier frequency is below a defined threshold. Additionally a transport format used in the second access technology can be adapted in order to reduce interference occurring due to second signals transmitted with the second access technology in the at least one first carrier frequency.

The different functional entities may be implemented by hardware or software, firmware or a combination thereof. It should be understood that the different nodes 100 and 200 can comprise further functional entities such as a human machine interface or a display, however, for the sake of clarity only those entities needed for the understanding of the invention are discussed.

The methods outlined above has the following advantages:

help legacy UE or first UE to perform its normal operation more efficiently and with less error due to the second RAT.

help a network to adapt its configuration to a second existing RAT operating inside its bandwidth.

ABBREVIATION EXPLANATION

NB-IOT Narrow-Band Internet of Things
M2M Machine to Machine
Tx Transmitter
UE User Equipment
BS Base Station
eNB Evolved Node B, base station
E-UTRAN Evolved universal terrestrial radio access network
E-UTRA Evolved universal terrestrial radio access
E-UTRA FDD E-UTRA frequency division duplex
E-UTRA TDD E-UTRA time division duplex
LTE Long term evolution
RAT Radio Access Technology
TDD Time division duplex
WLAN Wireless Local Area Network
DL Downlink
SINR Signal-to-Interference Ratio
DPD Digital Predistortion
IM Inter modulation

The invention claimed is:

1. A method for operating a second user equipment which uses a second access technology with at least one second carrier frequency to access a second access node in a second cell of a second cellular network, the method comprising:
receiving information from the second access node by which the second user equipment is informed that the second access node or the second user equipment is operating in the second cell within a bandwidth of a first carrier frequency used to access a first cellular network with a first access technology;
adapting the operation of the second user equipment taking into account the received information, wherein adapting the operation of the second user equipment comprises:
avoiding listening to signals that are transmitted or expected to be transmitted in radio resources within a bandwidth of the second access technology or avoiding using signals that are transmitted or expected to be transmitted in radio resources within a bandwidth of the second access technology; and/or
applying a compensation to received signals taking into account errors when the second user equipment uses a signal related to the first access technology within a bandwidth of the second access technology; and/or
adapting measurement procedures responsive to operation of the second access technology by the second user equipment within the bandwidth of the first carrier frequency, wherein adapting comprises extending a measurement period or increasing a number of measurement samples within the measurement period.

2. The method of claim 1, wherein the operation is adapted such that an interference with signals exchanged in accordance with the first access technology is at least reduced.

3. The method of claim 1, further comprising informing the second access node about the fact that the operation of the second user equipment has been adapted.

4. The method of claim 1, wherein the received information comprises:
information about the bandwidth of the first carrier frequency; and/or
information about the first carrier frequency; and/or
information whether first signals exchanged in accordance with the first access technology are transmitted in radio resources used by the second access technology; and/or
information about predefined first signals exchanged in accordance with the first access technology are transmitted within a second bandwidth of the second carrier frequency.

5. The method of claim 1, wherein the receiving information comprises receiving information indicating whether the operation is considered an in-band or guard band operation.

6. The method of claim 1, wherein the adapting the operation of the second user equipment comprises:
adapting a use of radio resources of the second access technology in such a way that an interference level occurring due to second signals transmitted in accordance with the second access technology in the first carrier frequency is below a defined threshold; and/or
adapting a transport format used in the second access technology in order to reduce interference occurring due to second signals transmitted with the second access technology in the first carrier frequency.

7. The method of claim 1, wherein the second user equipment is a wireless device.

8. The method of claim 1:
wherein the receiving information from the second access node comprises receiving information from the second access node by which the second user equipment is informed that the second access node or the second user equipment is operating in a first cell of the first cellular network, in which a first user equipment uses the first access technology with the first carrier frequency to access the first cell of the first cellular network, the first carrier frequency having the bandwidth;
wherein the operation of the second access node or the second user equipment in the first cell in accordance with the second access technology is within the bandwidth of the first carrier frequency.

9. A second user equipment configured to use a second access technology with at least one second carrier frequency to access a second cell of a second cellular network, the second user equipment comprising:
processing circuitry;
memory containing instructions executable by the processing circuitry whereby the second user equipment is operative to:
receive information from a second access node by which the second user equipment is informed that the second access node or the second user equipment is operating in the second cell within a bandwidth of a first carrier frequency used to access a first cellular network with a first access technology;

adapt the operation of the second user equipment taking into account the received information, wherein the adaption of the operation of the second user equipment comprises:
- avoiding listening to signals that are transmitted or expected to be transmitted in radio resources within a bandwidth of the second access technology or avoiding using signals that are transmitted or expected to be transmitted in radio resources within a bandwidth of the second access technology; and/or
- applying a compensation to received signals taking into account errors when the second user equipment uses a signal related to the first access technology within a bandwidth of the second access technology; and/or
- adapting measurement procedures responsive to operation of the second access technology by the second user equipment within the bandwidth of the first carrier frequency, wherein adapting comprises extending a measurement period or increasing a number of measurement samples within the measurement period.

10. The second user equipment of claim 9, further being configured to adapt the operation of the second user equipment such that an interference with signals exchanged in accordance with the first access technology is at least reduced.

11. A non-transitory computer readable recording medium storing a computer program product for controlling operation of a second user equipment which uses a second access technology with at least one second carrier frequency to access a second access node in a second cell of a second cellular network, the computer program product comprising software instructions which, when run on processing circuitry of the second user equipment, causes the second user equipment to:
- receive information from the second access node by which the second user equipment is informed that the second access node or the second user equipment is operating in the second cell within a bandwidth of a first carrier frequency used to access a first cellular network with a first access technology;
- adapt the operation of the second user equipment taking into account the received information, wherein the adaptation of the operation of the second user equipment comprises:
  - avoiding listening to signals that are transmitted or expected to be transmitted in radio resources within a bandwidth of the second access technology or avoiding using signals that are transmitted or expected to be transmitted in radio resources within a bandwidth of the second access technology; and/or
  - applying a compensation to received signals taking into account errors when the second user equipment uses a signal related to the first access technology within a bandwidth of the second access technology; and/or
  - adapting measurement procedures responsive to operation of the second access technology by the second user equipment within the bandwidth of the first carrier frequency, wherein adapting comprises extending a measurement period or increasing a number of measurement samples within the measurement period.

* * * * *

UNITED STATES PATENT AND TRADEMARK OFFICE
CERTIFICATE OF CORRECTION

PATENT NO. : 11,006,286 B2
APPLICATION NO. : 15/325906
DATED : May 11, 2021
INVENTOR(S) : Kazmi et al.

It is certified that error appears in the above-identified patent and that said Letters Patent is hereby corrected as shown below:

On the Title Page

On Page 2, Item (56), under "OTHER PUBLICATIONS", in Column 2, Line 1, delete ""NB-loT-DL" and insert -- NB-IoT-DL --, therefor.

On Page 2, Item (56), under "OTHER PUBLICATIONS", in Column 2, Line 6, delete "(CloT)" and insert -- (CIoTs) --, therefor.

In the Specification

In Column 2, Lines 9-10, delete "downlink physical control channel (NB-PDCCH) and downlink physical shared channel (PDSCH)." and insert -- physical downlink control channel (NB-PDCCH) and physical downlink shared channel (NB-PDSCH). --, therefor.

In Column 2, Line 11, delete "UE" and insert -- UE, --, therefor.

In Column 5, Line 18, delete "(RBI)" and insert -- (RB1) --, therefor.

In Column 7, Line 20, delete "representation" and insert -- representation of --, therefor.

In Column 8, Line 54, delete "(cell2 cell 310" and insert -- (cell2 or cell 310 --, therefor.

In Column 9, Line 20, delete "(cell2 cell 310" and insert -- (cell2 or cell 310 --, therefor.

In Column 10, Line 39, delete "(Ês/Iot)), RSRQ etc)" and insert -- (Ês/IoT), RSRQ etc.) --, therefor.

In Column 10, Line 65, delete "dBs≤SNR<-6" and insert -- dB≤SNR<-6 --, therefor.

In Column 16, Line 3, delete "cell2 (cell 310" and insert -- (cell2 or cell 310 --, therefor.

Signed and Sealed this
Seventh Day of June, 2022

Katherine Kelly Vidal
*Director of the United States Patent and Trademark Office*

CERTIFICATE OF CORRECTION (continued)
U.S. Pat. No. 11,006,286 B2

In Column 18, Line 17, delete "etc." and insert -- etc.; --, therefor.

In Column 18, Line 26, delete "etc." and insert -- etc.; --, therefor.

In Column 22, Line 40, delete "technology." and insert -- technology, --, therefor.

In Column 22, Line 43, delete "form" and insert -- from --, therefor.

In Column 25, Line 14, delete "Things" and insert -- Thing --, therefor.

In Column 25, Line 31, delete "Signal-to-Interference Ratio" and insert -- Signal-to-Interference-Plus-Noise Ratio --, therefor.